(12) United States Patent
Rowan

(10) Patent No.: US 6,911,823 B2
(45) Date of Patent: Jun. 28, 2005

(54) METAL DETECTOR EMPLOYING STATIC DISCRIMINATION

(75) Inventor: Mark D. Rowan, Lebanon, OR (US)

(73) Assignee: White's Electronics, Inc., Sweet Home, OR (US)

( * ) Notice: Subject to any disclaimer, the term of this patent is extended or adjusted under 35 U.S.C. 154(b) by 42 days.

(21) Appl. No.: 10/370,306

(22) Filed: Feb. 14, 2003

(65) Prior Publication Data

US 2003/0160617 A1 Aug. 28, 2003

Related U.S. Application Data

(63) Continuation-in-part of application No. 10/074,349, filed on Feb. 11, 2002.

(51) Int. Cl.⁷ .............................. G01V 3/08; G01V 3/10
(52) U.S. Cl. ...................................... 324/326; 324/329
(58) Field of Search ................................ 324/326, 329, 324/228, 232, 233, 239, 327; 340/551, 870.26

(56) References Cited

U.S. PATENT DOCUMENTS

| | | | |
|---|---|---|---|
| 3,686,564 A | | 8/1972 | Mallick, Jr. et al. |
| 3,986,104 A | * | 10/1976 | Randolph, Jr. ............... 324/327 |
| 4,263,551 A | * | 4/1981 | Gregory et al. ............. 324/233 |
| 4,300,097 A | | 11/1981 | Turner |
| 4,439,734 A | | 3/1984 | Weber |
| 4,486,712 A | | 12/1984 | Weber |
| 4,486,713 A | | 12/1984 | Gifford |
| 4,628,265 A | * | 12/1986 | Johnson et al. ............. 324/329 |
| 4,678,992 A | | 7/1987 | Hametta |
| 4,853,617 A | | 8/1989 | Douglas et al. |
| 4,894,618 A | | 1/1990 | Candy |
| 4,942,360 A | | 7/1990 | Candy |
| 4,992,741 A | | 2/1991 | Douglas et al. |
| 5,028,870 A | | 7/1991 | Reed |
| 5,047,718 A | | 9/1991 | Aittoniemi et al. |
| 5,365,169 A | | 11/1994 | Hosohara et al. |
| 5,405,143 A | | 4/1995 | Takemoto et al. |
| 5,506,506 A | | 4/1996 | Candy |
| 5,521,583 A | | 5/1996 | Frahm et al. |
| 5,523,739 A | | 6/1996 | Manneschi |
| 5,576,624 A | | 11/1996 | Candy |
| 5,642,050 A | * | 6/1997 | Shoemaker ................. 324/329 |
| 5,680,048 A | | 10/1997 | Wollny |
| 5,680,103 A | | 10/1997 | Turner et al. |
| 5,721,489 A | | 2/1998 | Weaver et al. |
| 5,729,143 A | | 3/1998 | Tavernetti et al. |
| 5,777,478 A | | 7/1998 | Jackson |
| 5,786,696 A | | 7/1998 | Weaver et al. |
| 5,959,451 A | | 9/1999 | De Torfino |
| 5,963,035 A | | 10/1999 | Won |
| 6,087,833 A | | 7/2000 | Jackson |
| 6,104,193 A | | 8/2000 | Bell |
| 6,286,370 B1 | | 9/2001 | Sinha |

* cited by examiner

Primary Examiner—Jay Patidar
Assistant Examiner—Kenneth J Whittington
(74) Attorney, Agent, or Firm—Birdwell & Janke, LLP

(57) ABSTRACT

A metal detector employing static discrimination. Within the scope of the invention is a two-frequency method and apparatus for discriminating between metal objects and ground. Also within the scope of the invention is a three-frequency method and apparatus for discriminating between ferrous and non-ferrous metal objects. The methods and apparatus do not require movement of the search head of the metal detector.

26 Claims, 2 Drawing Sheets

METAL DETECTOR EMPLOYING STATIC DISCRIMINATION

REFERENCE TO RELATED APPLICATIONS

This is a continuation-in-part of U.S. Ser. No. 10/074,349, filed Feb. 11, 2002.

FIELD OF THE INVENTION

The present invention relates generally to a metal detector employing static discrimination between metal objects and ground, and between ferrous and non-ferrous metal objects.

BACKGROUND OF THE INVENTION

Metal detectors are popularly used by hobbyists and collectors to search for buried or otherwise hidden metal objects of value or particular interest, such as coins, jewelry, and artifacts of historical significance. The metal detectors typically employ a transmit coil through which current flows, the current establishing time-varying magnetic fields that induce eddy currents in metal objects, and interact with any magnetic permeability of the metal object. These effects are detected in a receive coil, and are used to identify the metal objects.

In addition to metal objects of interest, the ground itself typically contains metallic compounds, particularly compounds containing iron. The iron compounds in particular have a relatively high magnetic permeability that often masks the response of the detector to the metal objects in the ground. It is a problem in the metal detector art to eliminate all the ferrous mineral signals in the target volume of ground while retaining sufficient information to identify the metal objects.

The ground also may be primarily electrically conductive as opposed to magnetically permeable or ferritic. For example, beach sand contains salt water. For this type of ground signals detected by the receive coil may be indicative of the conductivity of the ground rather than the metal objects. For either ferritic or conductive ground, it is necessary to minimize or eliminate the effect of the ground on the received signals, and this is a problem in the art.

It may be noted that, traditionally, "induction balance," "frequency domain" or "continuous wave" metal detectors employ a sinusoidal interrogating signal at a specific frequency. However, even where the interrogating signal is not sinusoidal, the signal is often Fourier analyzed into specific frequency components. The response therefore has a magnitude and phase that are in general altered from the magnitude and phase of the original signal as a result of the (complex) impedance of the target.

The impedance of the target has a real part that produces a (vector) component of the response that is in-phase with the interrogating frequency, and a so-called imaginary part that produces another component of the response that is in-quadrature, or 90 degrees out of phase with the interrogation frequency. It may be noted that the real component of a vector is often identified in engineering and mathematics with the horizontal "x" axis of a standard Cartesian coordinate system, while the imaginary component is identified with the vertical "y" axis. However, in the metal detector art, metal detector responses are sometimes graphed so that the real part of the response is plotted on a vertical "Y" axis that represents zero phase shift, with a horizontal "X" axis depicting negative and positive phase deviations from the "Y" axis. This scheme is used herein.

The real, or "Y" component of a given frequency specific response vector represents the effect of the conductivity of all of the material contributing to the response at the specific frequency, while the imaginary, or "X" component represents the effect at the frequency of the reactance of this material. For non-ferrous metal materials and salt-water, the resistive component of the response will be much greater than the reactive component; conversely, for ferrous metals and soil containing iron, the reactive component is larger than the resistive component. For a given, highly conductive non-ferrous object at a suitably high frequency, e.g., a silver dollar at 50 kHz, nearly all of the response will fall on the "X" axis. The "Y" component of the response may be negligible. The ratio of the "X" component to the "Y" component depends on the material of which the object is formed, the size and shape of the object, and the interrogating frequency.

The detector resolves the total frequency specific response into its Y and X components, each providing information about the target volume of ground. In frequency domain metal detectors, that information is typically the phase shift of the response with respect to the transmitted signal.

In addition to the requirement to distinguish the response from ground, it is necessary to be able to distinguish one metal object from another, i.e., to distinguish one phase shift from another. Accomplishing both of these objectives generally requires two independent methods for detecting responses that are insensitive to ground.

In one of these methods, termed "motion discrimination," the user is required to keep the transmit coil in motion. The ground is not necessarily homogeneous, but both the permeability and the conductivity of the ground are relatively constant over a limited area, so that detected signals resulting from ground are relatively slowly varying compared to signals resulting from the much more localized metal objects; the metal objects cause changes in the detected signals that are perceived by the metal detector to have a relatively high frequency. Then, high or band-pass filtering may be used to filter out the low frequency portion of the detected signals corresponding to the ground.

In the other conventional method for detecting responses that are insensitive to ground, often referred to as "ground balancing," a location on the ground is selected for calibrating the detector, and it is determined how to linearly combine the X and Y components of the response so that it is zero, or put another way, it is determined how much to rotate the X and Y coordinate system to align it with the phase angle of the ground so that, at the phase angle of the ground, the response is nulled. In practice, this can be achieved by varying the phase angles of respective synchronous demodulators so that the demodulators are insensitive to components with a phase equal to the phase angle of the ground.

More recently, metal detectors have been provided that employ two interrogating frequencies, so that four response components may be obtained as described above. A lower frequency is provided that is particularly suited for detecting larger objects, especially those of good conductors like copper or silver, and a higher frequency is provided that is more suited for detecting smaller objects and objects that are composed of metals which are relatively poor conductors. The user of such a detector may select between the two frequencies depending on the type of object that the user is searching for.

To ground balance dual frequency detectors, Candy, U.S. Pat. No. 4,942,360, proposes forming various linear combinations of the four X and Y components. For example, to null the response for reactive soil, the '360 Patent proposes among other things forming a linear combination of the reactive components for the two frequencies. The use of two interrogation frequencies is apparently to provide for ground balancing both salt water and ferritic ground. Motion discrimination would still be required to provide an independent means of measuring phase shift independent of the ground.

Other attempts at dual frequency discrimination have not been successful. For example, one method in use uses a ratio of the Y terms to identify targets. However, these signals are not free of the effects of ground which severely compromises the performance of the method. A similar method has been used to rotate the Y axes as needed to balance the ground, and the ratio of the rotated values of Y is used to identify targets. However, a significant error is introduced by the rotation. In addition, it is a problem in all of these methods that ferrous and non-ferrous metals can be confused with one another, and it is often desired to be able to discern that a metal object is ferrous so that the user can decide to expend no further effort to uncover the object.

Motion discrimination has the obvious disadvantage that it is demanding of the user in terms of both effort and skill. It may also result in ambiguities where there are multiple metal objects in the target volume. Accordingly, there is a need for a metal detector employing static discrimination that permits discriminating between metal objects and ground, and between ferrous and non-ferrous metal objects without requiring that the search coil of the metal detector be in motion.

SUMMARY OF THE INVENTION

Disclosed is a metal detector employing static discrimination. Within the scope of the invention, there is a method and apparatus for characterizing a metal object. The metal object is interrogated with a first sinusoidal frequency component at a first frequency and a second sinusoidal frequency component at a second frequency, the first and second frequencies being distinct from one another. First and second response frequency components corresponding to the first and second frequency components are determined. The metal object is characterized by comparing the first response frequency component with the second response frequency component.

Preferably, the method and apparatus provide for discriminating between the metal object and ground. The ground is interrogated with a third sinusoidal frequency component at the first frequency and a fourth sinusoidal frequency component at the second frequency. Third and fourth response frequency components corresponding to the third and fourth sinusoidal frequency components are determined. The first and second response frequency components are adjusted with information obtained from the third and fourth response frequency components so as to cancel the effect of the ground.

Also within the scope of the invention is a method and apparatus for discriminating between ferrous and non-ferrous metal objects. An unknown metal object is interrogated with a first sinusoidal frequency component at a first frequency, a second sinusoidal frequency component at a second frequency, and a third sinusoidal frequency component at a third frequency, the first, second and third frequencies being distinct from one another. First, second and third response frequency components corresponding to the first, second and third frequency components are determined. A first phase shift from the first and second response frequency components is determined corresponding to changing interrogation from said first frequency to said second frequency, and a second phase shift from one of the first and second response frequency components and the third response frequency component is determined corresponding, respectively, to changing interrogation from one of said first and second frequencies to said third frequency. The metal object is characterized as being ferrous or non-ferrous by use of the first phase shift and the second phase shift.

Preferably, the method and apparatus further compare the first and second phase shifts with corresponding reference phase shifts for known metal objects including at least one ferrous metal object and at least one non-ferrous metal object.

Therefore, it is an object of the present invention to provide a novel and improved metal detector.

It is another object of the present invention to provide a metal detector providing improved discrimination between metal objects and ground.

It is another object of the present invention to provide a metal detector providing improved discrimination between ferrous and non-ferrous metal objects.

It is still another object of the invention to provide a metal detector that employs static discrimination between metal objects and ground.

It is yet another object of the present invention to provide a metal detector that employs static discrimination between ferrous and non-ferrous metal objects.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
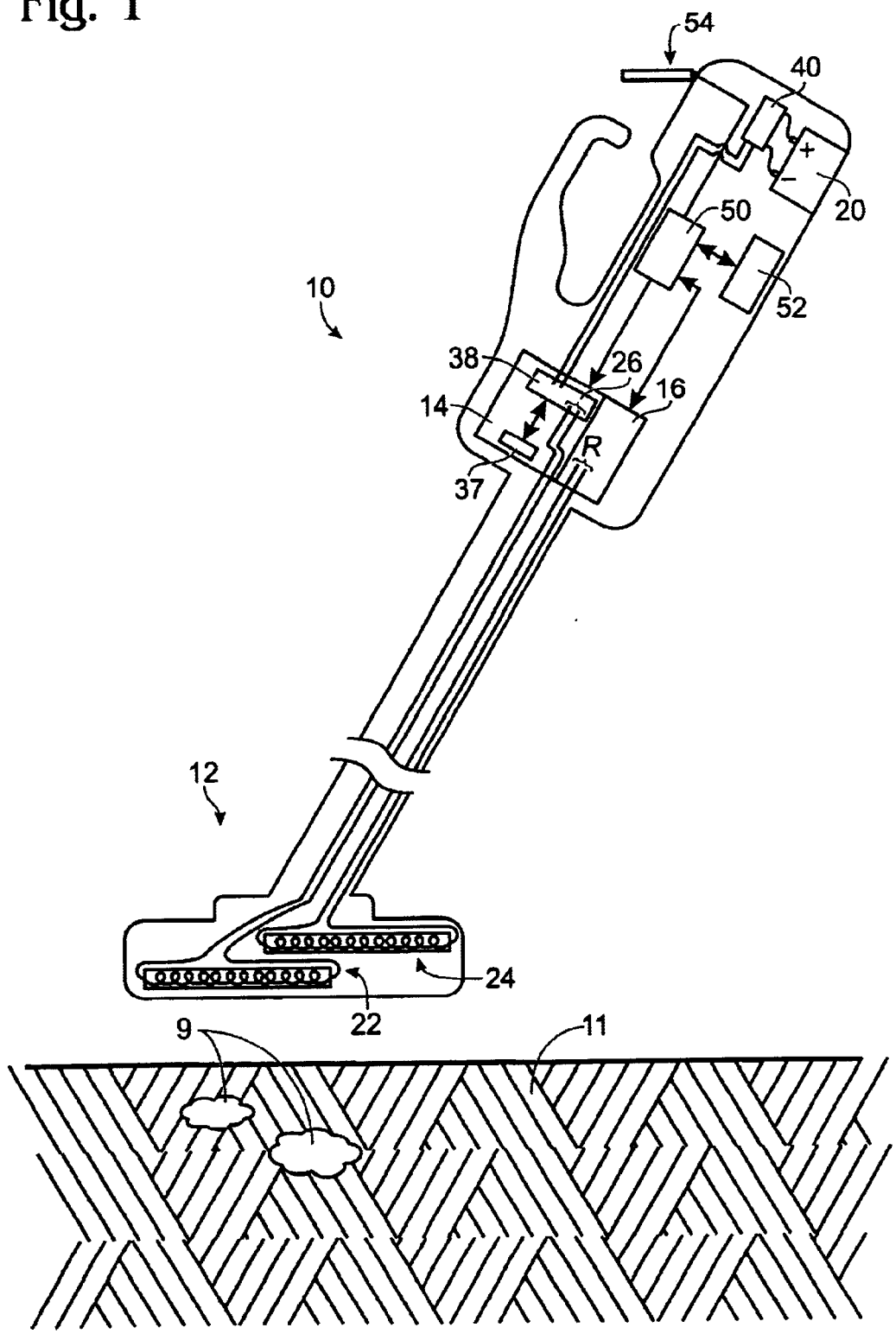
FIG. 1 is a pictorial/schematic view of a metal detector.

Referring to FIG. 1, a metal detector 10 is shown. The metal detector 10 is particularly adapted for hand-held use, such as by hobbyists, however, this is not essential to the context of the present invention. The detector is used to search for metal objects 9 in a target volume 11 that is typically ground but may be any volume. Since the detector is typically used outdoors to search for metal objects away from independent sources of power, the detector typically incorporates a battery 20 to power the detector, though the detector 10 may be used with any power source.

The metal detector 10 includes an interrogating portion, a receiving portion, and a processing portion. The interrogating and receiving portion share a search head 12. The interrogating portion comprises a signal generator 14 and the receiving portion comprises a sampling circuit 16. The search head is maintained in close proximity with the ground 11. The signal generator 14 generates interrogating signals for producing eddy currents in the metal objects 9. In an induction balance metal detector, the interrogating signals include one or more sinusoidal signal components having discrete frequencies. The components can be produced as discrete sinusoidal signals, or be the result of filtering any substantially continuous signal from which the sinusoidal signal components can be Fourier identified. In a preferred embodiment of the invention, a square wave is produced having a plurality of Fourier components from which two or more interrogating signals can be identified in the range of about 3 kHz to about 15 kHz. The interrogating signals are transmitted to the metal objects through the search head 12, particularly, a transmit coil 22 therein. Eddy currents are produced in the target in response to the interrogating signals.

The eddy currents induce a response "R" in the search head 12, particularly a receive coil 24 therein. The receive coil 24 is coupled to the sampling circuit 16 which samples the response R to discern sinusoidal signal components of the response ("sinusoidal response frequency components"). While the transmit and receive coil can be the same coil, it is preferable to employ at least the two separate coils 22 and 24 in a standard induction balance configuration. As a common alternative, a third coil may be used to null the effect of the transmit coil 22, wherein the coils 22 and 24 and the third coil are all concentric.

Within the processing portion of the metal detector 10, a processor or CPU 50 performs calculations as indicated herein, and predetermined data as provided herein may be provided in one or more look-up tables 52 in communication with the processor 50. The metal detector typically includes a display device 54, such as an LCD, for displaying instructions, data, and target information to the user.

Two Frequency Discrimination Method and Apparatus

Figure 2:
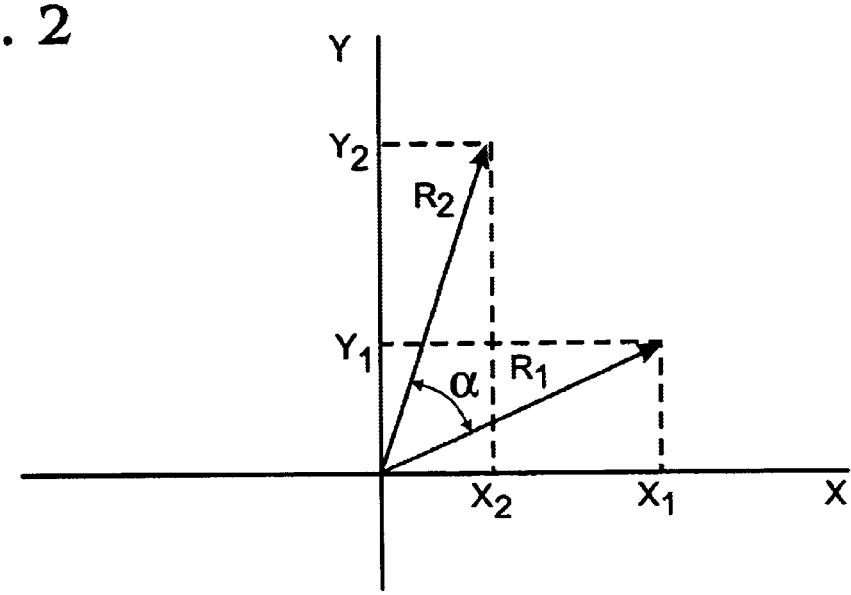
FIG. 2 is a plot, in a Cartesian, X-Y complex plane, of two response frequency components $R_1$ and $R_2$ of a response R, and the corresponding frequency response sub-components $X_1$, $Y_1$, and $X_2$, $Y_2$, respectively.

A two-frequency discrimination method and apparatus according to the present invention recognizes that the responses R to two sinusoidal signal components will in general be different; however, the responses will differ in a predictable way. Turning to FIG. 2, an X-Y plot of two responses $R_1$ and $R_2$ from a hypothetical target volume of ground is shown, where the subscripts identify two different interrogating frequencies $F_1$ and $F_2$. There are no metal objects in the ground, and the purpose of obtaining the responses $R_1$ and $R_2$ is to determine how to modify the response R to a volume of the same or substantially the same type of ground that includes metal objects to subtract out the effect of the ground. This is accomplished by taking one of the sinusoidal response frequency components, e.g., $R_2$, and modifying it ($R_m$) so that it is equal to the other response frequency component $R_1$. While the discussion to follow is based on modifying $R_2$ so that it is equal to $R_1$, it applies equally to the case where $R_1$ is modified so that it is equal to $R_2$, and the analysis follows similarly by replacing the appropriate subscript in the expressions below. Also note that, herein, the response R is referred to as having Cartesian components X and Y, and frequency components $R_1$ and $R_2$, where the Cartesian components X and Y of the response define frequency sub-components $X_1$, $X_2$, and $Y_1$, $Y_2$.

Where $R_2$ has been modified, subtracting one of the modified response frequency components $R_m$ and the response frequency component $R_1$ from the other subtracts the effect of the ground. $R_m$ in this example has two response sub-components $X_m$ and $Y_m$ as follows:

$$X_m = X_1 = R^* \cdot [X_2 \cos(\alpha) - Y_2 \sin(\alpha)]; \text{ and}$$

$$Y_m = Y_1 = R^* \cdot [X_2 \sin(\alpha) + Y_2 \cos(\alpha)],$$

where $R^* = |R_1|/|R_2|$, and $\alpha$ is the difference in the phases of the two response components $R_1$ and $R_2$.

Where neither $X_2$ nor $Y_2$ is zero, a simpler expression for the components $R_m$ is used herein:

$$X_m = X_1 = A \cdot X_2; \text{ and}$$

$$Y_m = Y_1 = B \cdot Y_2,$$

where $A = X_1/X_2$, and $B = Y_1/Y_2$. For an ideal ferritic ground, the response R, and therefore its X and Y components, does not change with frequency, and $A = B = 1$. However, in general, the ground is not purely ferritic, and a ground canceling operation is thereby defined as:

$$X_{ground\ cancelled} = X_m - X_1 = (A \cdot X_2) - X_1; \text{ and}$$

$$Y_{ground\ cancelled} = Y_m - Y_1 = (B \cdot Y_2) - Y_1. \qquad \text{Eqn 1}$$

When the detector is used to discern a metal object that is present in the ground, the detector receives a generalized response R which is the vector sum of a contribution $R_{(object)}$ (with components $X_{(object)}$ and $Y_{(object)}$) to the response R that is due to the metal object and a contribution $R_{(ground)}$ (with components $X_{(ground)}$ and $Y_{(ground)}$) to the response R that is due to the ground:

$$X = X_{(ground)} + X_{(object)}; \text{ and}$$

$$Y = Y_{(ground)} + Y_{(object)}.$$

Applying the ground canceling operation described above to the generalized response R provides:

$$X_{ground\ cancelled} = A \cdot [X_{2(ground)} + X_{2(object)}] - [X_{1(ground)} + X_{1(object)}]; \text{ and}$$

$$Y_{ground\ cancelled} = B \cdot [Y_{2(ground)} + Y_{2(object)}] - [Y_{1(ground)} + Y_{1(object)}],$$

which reduces to:

$$X_{ground\ cancelled} = A \cdot X_{2(object)} - X_{1(object)}; \text{ and}$$

$$Y_{ground\ cancelled} = B \cdot Y_{2(object)} - Y_{1(object)}. \qquad \text{Eqn 2}$$

If the ground is purely ferritic and $A = B = 1$, there is no need for ground cancellation, and the result of the ground cancellation operation is simply, $$X = X_{2(object)} - X_{1(object)}; \text{ and}$$

$$Y = Y_{2(object)} - Y_{1(object)}.$$

The phase shift $\Phi$ in the response R received by the metal detector due to the metal object as a result of changing the frequency from $F_1$ to $F_2$ can be simply determined in that case as:

$$\Phi = \tan^{-1}[\{Y_2 - Y_1\}/\{X_2 - X_1\}]. \qquad \text{Eqn 3}$$

This phase shift can be used to uniquely identify the metal object, by comparison with a standard look-up table including reference values of the phase shift for selected metal objects. The calculated phase shift can also be used to generate reference values, so that reference values for use in the context of the present invention can be obtained empirically, theoretically, or by the use of a combination of empirical and theoretical methods.

As an example of determining phase shifts or responses theoretically, the response R has in general an electric (conductive) part due to electrical conductivity and a magnetic (permeative) part due to magnetic permeability. A model of the phase shift Φ due to the conductive part of the response which takes into account the self-inductance of the target and the resistance of the target due to the distribution of current flow as a result of the "skin effect" is:

$$\Phi = \tan^{-1}[(2\pi FL)/\{Res \cdot (1 + K \cdot F^{1/2})\}],$$

where F is the interrogating frequency, L is the self-inductance, Res is the effective resistance at DC, and K is a proportionality constant characteristic of the object. The magnitude of the received signal is a complicated function of, among other things, the size and shape of the transmit coil, target size and shape, and interrogating distance. However, a normalized magnitude of the conductive part of the response, for a given target and configuration of the transmit and receive coils, is proportional to the target's inductive reactance divided by its total impedance:

$$(2\pi FL)/[(2\pi FL)^2 + R_{ac}^2], \text{ where } R_{ac} = Res \cdot \{1 + (K \cdot F^{1/2})\}.$$

The permeative part of the response is due to the alignment of magnetic domains in the target with the applied magnetic field that results from interrogating signals. As mentioned above, the ideal ferromagnetic response is independent of frequency; however, in real materials, there is hysteresis that results in phase lag, and the phase lag increases as the frequency increases, and this can be calculated as well.

While for a metal object in pure ferrite ground, in which A=B=1, Equation 3 indicates that the phase shift Φ in the response R between the two frequencies $F_1$ and $F_2$ is straightforwardly determined, essentially so that no ground cancellation is required, it is recognized that it remains a problem to identify the metal object from the phase shift measured in the presence of real ground in which A and B are not equal to 1. Particularly, Equations 2 indicate that the ground cancellation operation generally "skews" the determination of the phase shift Φ attributable to the metal object.

To account for this skew, according to the invention, a preliminary look-up table is constructed that permits predicting how the phase and magnitude of any target will change from one interrogating frequency to another:

$$X_1 = C \cdot X_2; \text{ and}$$

$$Y_1 = D \cdot Y_2, \qquad \text{Eqn 4}$$

where C and D are equivalent to the aforementioned A and B constants determined for the ground, that may be determined theoretically such as discussed above, or experimentally using real targets and interpolating where needed.

The balance of a preferred two-frequency discrimination method according to the invention is described by use of a specific example. For $F_1$=3280 kHz and $F_2$=13120 kHz, the following relative magnitude (|R|) and phase (θ) with respect to an interrogating signal (along with the equivalent Cartesian coordinates X and Y) at each of the two frequencies $F_1$ and $F_2$ resulting from interrogating several representative metal targets has been determined as provided below:

TABLE 1

| | $F_1$ | | | | $F_2$ | | | |
|---|---|---|---|---|---|---|---|---|
| | $R_1$ | $\theta_1$ | $X_1$ | $Y_1$ | $R_2$ | $\theta_2$ | $X_2$ | $Y_2$ |
| clad dollar | 1.457 | 10.166 | 1.434 | 0.257 | 1.550 | 2.552 | 1.548 | 0.069 |
| clad dime | 0.666 | 35.249 | 0.544 | 0.384 | 0.860 | 11.179 | 0.843 | 0.167 |
| Zn penny | 0.604 | 52.440 | 0.368 | 0.478 | 1.007 | 20.287 | 0.945 | 0.349 |
| pulltab | 0.304 | 71.355 | 0.097 | 0.288 | 0.900 | 44.891 | 0.638 | 0.635 |
| nickel (coin) | 0.290 | 77.077 | 0.065 | 0.283 | 0.909 | 49.478 | 0.590 | 0.691 |
| cigarette foil | 0.066 | 85.397 | 0.005 | 0.066 | 0.254 | 73.635 | 0.072 | 0.244 |

Using the data of Table 1, a preliminary table can be constructed relating the phase $\theta_2$ (phase response at $F_2$ relative to the interrogating signal) and the constants C and D of Equation 4 such as shown below:

TABLE 2

| $\theta_2$ | C | D |
|---|---|---|
| 73.635 | 0.070 | 0.272 |
| 49.478 | 0.110 | 0.417 |
| 44.891 | 0.177 | 0.645 |
| 20.287 | 0.389 | 1.359 |
| 11.179 | 0.656 | 2.211 |
| 2.552 | 0.967 | 2.279 |

The preliminary Table 2 can be constructed to any desired resolution and therefore can accommodate any number of idealized metal objects such as can be characterized analytically as discussed above Table 2 can also be constructed from empirical data obtained from measurements on actual objects as discussed above. Hereinafter, a "reference metal object" can be either an idealized metal object or an actual metal object. Interpolation may be used where desired, and Table 2 need only be constructed once for given frequencies $F_1$ and $F_2$.

Finally, given A and B, the manner in which the phase and the magnitude in the response R of the metal detector change due to changing the frequency from $F_1$ to $F_2$ can be determined from the relationship:

$$\Phi_{1-2} = \tan^{-1}[\{Y_2 \cdot (B-D)\}/\{X_2 \cdot (A-C)\}]. \qquad \text{Eqn 5}$$

The metal detector is preferably calibrated for the ground over which it is to be used and may need to be recalibrated if there is a change in the ground that is judged or determined to be significant. For exemplary purposes the following data, typical of ferromagnetic ground with a slightly conductive characteristic, can be assumed as a result of calibrating the metal detector with respect to the ground:

TABLE 3

| $X_{1(ground)}$ = −2.2, | $Y_{1(ground)}$ = 0.08; |
|---|---|
| $X_{2(ground)}$ = −2.0, | $Y_{2(ground)}$ = 0.10. |

In this example, the coefficients A=$X_1/X_2$, and B=$Y_1/Y_2$ are therefore:

$$A=1.1; B=0.8$$

Another table can then be constructed using the data from the preliminary Table 2 and the relation of Equation 5 to relate $\theta_2$ and $\Phi_{1-2}$ for, in this example, a change in frequency from $F_1$ to $F_2$:

TABLE 4

| (cig. foil)   | 73.635 | 60.77  |
|---------------|--------|--------|
| (nickel (coin)) | 49.478 | 23.97  |
| (pulltab)     | 44.891 | 6.97   |
| (Zn penny)    | 20.287 | −15.97 |
| (clad dime)   | 11.179 | −31.71 |
| (clad dollar) | 2.552  | −30.15 |

Table 4 generally must be constructed each time the detector is recalibrated for the effect of the ground. The data of Table 4 can also be determined on theoretical grounds. However the data are determined, they are incorporated in or otherwise made available to the metal detector, such as by a wireless data link to a remote database.

The data may be used by the metal detector to identify an unknown metal object that, in this example, is one of either a clad dollar, clad dime, zinc penny pulltab, nickel coin, or cigarette foil. This is accomplished by interrogating a target volume of ground 9 that is the same or substantially the same as the volume of ground used to obtain the coefficients A and B, except that the ground contains at least one of these objects. A total response R is obtained at the same frequencies $F_1$ and $F_2$ used to generate Tables 1–4. That response R is the vector sum of a contribution $R_{(object)}$ (with components $X_{(object)}$ and $Y_{(object)}$) to the response R that is due to the metal object and a contribution $R_{(ground)}$ (with components $X_{(ground)}$ and $Y_{(ground)}$) to the response R that is due to the ground.

To illustrate use of Table 4, it is assumed for convenience that the detector interrogates a target volume of ground 9 that includes a zinc penny and that the detector in fact measures the same data that were previously determined for the zinc penny in Table 1:

TABLE 5

| $X_{1(object)} = 0.368$, | $Y_{1(object)} = 0.478$, |
|---|---|
| $X_{2(object)} = 0.945$, | $Y_{2(object)} = 0.349$. |

It is further assumed for convenience that the detector is being used over the type of ground for which it has been calibrated and the ground is either reasonably homogeneous or the detector has been recalibrated, so that the same ground signal sub-components $X_{1(ground)}$, $X_{2(ground)}$, $Y_{1(ground)}$, and $Y_{2(ground)}$ given in Table 3 would actually be received by the metal detector when interrogating the target and therefore would be superposed with the response sub-components $X_{1(object)}$, $X_{2(object)}$, $Y_{1(object)}$, and $Y_{2(object)}$ of Table 5 to give components X and Y of a total, actual response R of the detector to the target at the two frequencies $F_1$ and $F_2$:

$X_1 = -1.832$, $Y_1 = 0.558$;

$X_2 = -1.055$, $Y_2 = 0.449$.

Using the coefficients $A = X_1/X_2$, and $B = Y_1/Y_2$, a ground cancellation operation is performed as described in Equation 1:

$X_{ground\ cancelled} = A \cdot X_2 - X_1 = 0.671$;

$Y_{ground\ cancelled} = B \cdot Y_2 - Y_1 = -0.199$.

Then, forming the quantity $Y_{ground\ cancelled}/X_{ground\ cancelled}$ and calculating a corresponding $\Phi_{1-2}$ provides:

$\Phi_{1-2} = \tan^{-1}[-0.199/0.671] = -16.52$ deg.

Finally, comparing with Table 4, a $\Phi_{1-2}$ of −16.52 degrees corresponds most closely to a $\theta_2$ of 20 degrees, which identifies the zinc penny.

It is an outstanding advantage of the two-frequency discrimination method and apparatus that two interrogation frequencies may be used to discriminate between different metal objects and ground without the need for motion discrimination. Alternatively, the two-frequency method and apparatus can employ motion discrimination to provide improvements in depth and accuracy over what can be achieved by the use of motion discrimination alone.

It should be understood that the two-frequency discrimination method and apparatus does not require identifying any particular metal object, and therefore does not require comparisons with reference data for known metal objects. In many instances, such as where the metal object is a type of object that is not anticipated, typically because it is rare or unusual, it may be advantageous simply to measure the response of the metal object to interrogation at two frequencies, determine the difference vector and report any desired parameter that characterizes the difference vector as being indicative of the metal object whether it is a known metal object or not.

Three Frequency Discrimination Method and Apparatus

As a result of their conductivity, iron objects will "mimic" non-iron objects in the two-frequency discrimination method because the ferromagnetic contribution to the response R of the metal detector from the iron object is nulled along with the effect of ferritic ground. Since common iron trash may assume almost any size and shape, it is often necessary to be able to distinguish ferrous metal objects from non-ferrous metal objects and the three-frequency discrimination employs an additional frequency to achieve this purpose.

A three-frequency discrimination method and apparatus according to the invention recognizes that, unlike the case for ferritic ground, the ferromagnetic component of the metal detector's response R to a target volume of ground containing ferrous metal objects does not remain constant with changes in frequency, due to weakening of the field produced in the interior of the object resulting from the secondary field produced by induced eddy currents flowing at or near the surface of the metal object. Moreover, for the same reason, the change in magnitude and phase of the metal detector's response to a ferrous metal object does not change with frequency in the same way as does the response to a non-ferrous metal object. That is, the coefficients C and D employed in the two-frequency discrimination method to predict the phase change resulting from a change in frequency from $F_1$ to $F_2$ do not apply. Therefore, while the two-frequency method cannot distinguish between ferrous and non-ferrous metal objects, use of an additional frequency can resolve the ambiguity.

According to the method, a version of Table 4 may be constructed for three-frequencies $F_1$, $F_2$, and $F_3$ and two phase shifts $\Phi_{1-2}$ and $\Phi_{2-3}$, where $\Phi_{1-2}$ is the phase shift in the response R of the metal detector due to changing the interrogating frequency from $F_1$ to $F_2$, and $\Phi_{2-3}$ is the phase shift in the response R of the metal detector due to changing the frequency from $F_2$ to $F_3$. Both $\Phi_{1-2}$ and $\Phi_{2-3}$ may be determined according to the two-frequency method discussed above (see resulting Table 4) in the general case where the ground in which the metal object is disposed is not purely ferrite.

Table 6 below considers the phase response of both ferrous and non-ferrous metal objects with respect to the three frequencies $F_1 = 3280$ kHz, $F_2 = 13120$ kHz, and $F_3 = 52480$ kHz in the simple case where the ground is assumed to be purely ferrite (A=B=1) and is exemplary:

TABLE 6

|  | $\Phi_{1-2}$ | $\Phi_{2-3}$ |
|---|---|---|
| steel ball | 16.22 | 1.77 |
| large bolt | −37.76 | −46.45 |
| gutter nail | −35.00 | −47.66 |
| clad dime | −33.99 | −60.30 |
| Zn penny | −10.63 | −50.91 |
| pulltab | 34.72 | −20.60 |
| nickel (coin) | 39.82 | −15.30 |
| cig. foil | 71.57 | 29.56 |

If only the phase shift $\Phi_{1-2}$ is considered, such as in a two-frequency discrimination method, the ferrous bolt, at $\Phi_{1-2}=-37.76$, the ferrous gutter nail, at $\Phi_{1-2}=-35.00$, and the non-ferrous clad dime, at $\Phi_{1-2}=-33.99$, could each be confused with the others. However, the corresponding phase shifts $\Phi_{2-3}$ for the ferrous objects and the dime differ. Therefore, an ambiguity between a ferrous and a non-ferrous metal object resulting from the use of a two-frequency discrimination method is resolved by use of the third frequency $F_3$. The ambiguity, in this example, between the bolt and nail remains unresolved, but a failure of the method to discriminate between similarly ferrous metal objects having similar size and shape is typically unimportant to the hobbyist or collector, as it is often desired simply to discern that the metal object is ferrous so that it can be rejected. It may be noted in this regard that the two-frequency method in this example does provide for ample discrimination between the steel ball, on the one hand, and the bolt and nail, on the other.

While the three-frequency method and apparatus is preferably based on the two-frequency method and apparatus described above, it is not essential to distinguishing between ferrous and non-ferrous metal objects to employ ground cancellation. Moreover, either of the two or three-frequency discrimination methods and apparatus may be employed in conjunction with other methods to improve the resolution, accuracy, and depth of metal detection, especially in ground. For example, while combining conventional motion discrimination with techniques with prior art ground balancing techniques is not particularly advantageous, the two and three frequency methods and apparatus according to the present invention may be used with motion discrimination, e.g., by 10 Hz bandpass filtering the response R, to provide outstanding benefits.

G-Ratio Method

Figure 3:
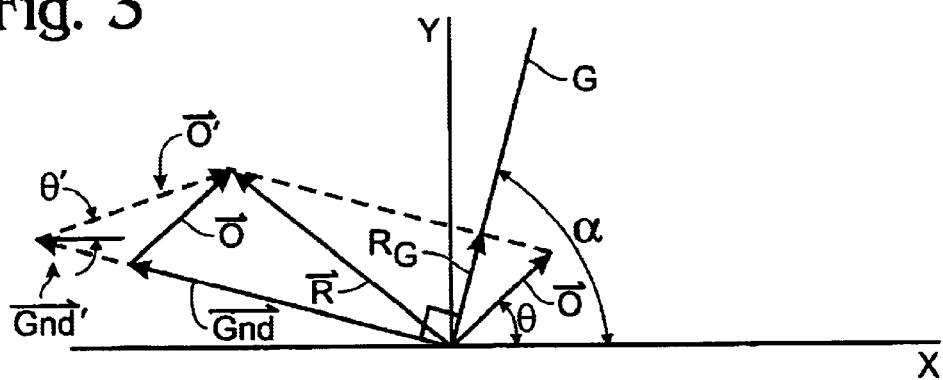
FIG. 3 is a plot, in a Cartesian, X-Y complex plane, of a vector response to interrogation of a metal object buried in ground at a single frequency.

A general problem is illustrated in FIG. 3. A metal object buried in the ground is interrogated at a frequency F. The metal detector receives a response R that is the vector sum of a ground response vector Gnd and a response vector O due to the object. A "G" axis may be constructed without knowing the magnitude of the vector Gnd, by varying the angle $\alpha$ of demodulation of the response to a calibrating volume of ground until the ground is "nulled," and using this angle of demodulation during interrogation as is standard practice in the metal detector art. The G axis is perpendicular to the ground response vector Gnd and is insensitive to the ground because the ground response projected on the G axis is zero.

With the response R and the orientation $\alpha$ of the G axis known, the "ground balanced" component of R along the G axis, $R_G$, can be determined. However, the phase angle $\theta$ corresponding to the phase shift due to the metal object cannot be determined, fundamentally because there is no way to distinguish between the vectors Gnd and O, with phase angle $\theta$, and the vectors Gnd' and O', with phase angle $\theta'$. Since metal objects are conventionally identified by their characteristic phase angles $\theta$, the metal object in this example cannot be identified.

Figure 4:
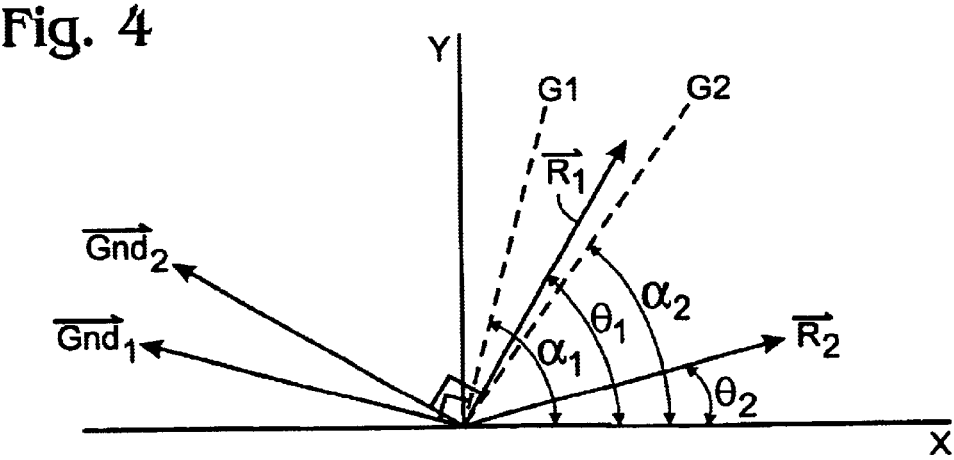
FIG. 4 is a plot, in a Cartesian, X-Y complex plane, of vector responses to interrogation of a metal object buried in ground at two frequencies, illustrating a "G-ratio" method according to the present invention.

To solve this problem, a particular embodiment of the two-frequency and three frequency methods discussed above referred to as the "G-ratio" method is described in connection with FIG. 4. Hypothetical target responses $R_1$ and $R_2$ are shown as a result of interrogating the target at two frequencies F1 and F2, respectively, along with corresponding hypothetical ground responses $Gnd_1$ and $Gnd_2$ at the two frequencies. Axes G1 and G2 may be constructed as ground balanced axes because they are perpendicular to the ground response vectors.

The angular orientation of the response vectors R and the G axes are defined by angles $\theta$ and $\alpha$, respectively. Particularly, the response vector $R_1$ is oriented at an angle $\theta_1$, the response vector $R_2$ is oriented at an angle $\theta_2$, the G vector $G_1$ is oriented at an angle $\alpha_1$, and the G vector $G_2$ is oriented at an angle $\alpha_2$. Accordingly, quantities A and B can be defined such that:

$A=R_1$ projected onto $G_1=R_1\cos(\alpha_1-\theta_1)$; and $B=R_2$ projected onto $G_2=R_2\cos(\alpha_2-\theta_2)$.

A "G-ratio" may be defined as:

$$\text{G-ratio}=A/B=\cos(\alpha_1-\theta_1)/[\cos(\alpha_2-\theta_2)\cdot|R_2/R_1|], \qquad \text{Eqn 6}$$

where the ratio $|R_2/R_1|$ expresses the relative magnitudes of the vectors $R_2$ and $R_1$. Both the numerator and denominator are assumed to have the same dependence on the depth of the target, which therefore cancels out.

A table may be constructed at the factory relating the responses R and their angles $\theta$ for various reference metal objects (apart from ground) at the frequencies F1 and F2, along with the ratio $|R_2/R_1|$. The ground balanced axes G, and therefore the angles $\alpha$, are determined in operation of the metal detector. Then, equation 6 may be solved for each value of $\theta$ in the table, to obtain a calculated G-ratio for each reference metal object represented in the table.

In addition, a measured G-ratio may be obtained in operation of the detector by ground balancing the detector, noting the angles for which ground balancing is accomplished for the two frequencies, and demodulating the responses at these angles so that the responses are actually projected onto the G-axes, as is standard methodology in the art. The ratio of these responses equals the G-ratio, and this measured G-ratio can then be compared with the calculated G-ratios indicated above to find a best match that identifies the metal object.

As indicated in the discussion above regarding the three-frequency method, ferrous targets will mimic nonferrous targets with this two-frequency embodiment of the G-ratio method. To provide ferrous discrimination, a third frequency F3 can be employed, where the two-frequency G-ratio method described above is used at two distinct pairs of frequencies, e.g., F1 and F2, and F1 and F3. According to the invention, if the target identified by the G-ratio measured at the first pair of frequencies F1 and F2 does not agree with the target identified by the G-ratio measured at the second pair of frequencies F1 and F3, the target is identified as being ferrous, and if the targets identified by the G-ratios do agree, then the target is identified as being non-ferrous.

It is to be recognized that, while a particular metal detector employing static discrimination has been shown and described as preferred, other configurations and methods could be utilized, in addition to those already mentioned, without departing from the principles of the invention. For example, while described in the context of an induction balance, continuous-wave or frequency domain metal detector, time-domain or pulse induction techniques may be employed with suitable modification without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. A method for characterizing a target metal object in ground, comprising:
   (a) characterizing the ground at two distinct sinusoidal frequencies of interrogation;
   (b) characterizing the target metal object in [[the ground at said two frequencies:
   (c) characterizing a plurality of reference metal objects apart from the ground at said two frequencies;
   (d1) computing a respective first number for each of said reference metal objects using the characterizations of said steps (a) and (c);
   (d2) computing a second number for the target, metal object using the characterization of step (b);
   (e) comparing said first and second numbers; and
   (f) characterizing the target metal object with the result of the comparison of said step (e), wherein the characterizing step (a) provides for determining at least the ratios (Y1ground/Y2ground) and (X1ground/X2ground), where X1ground, Y1ground are reactive and resistive components of the response of the ground to interrogation at a first of said two frequencies, where X2ground, Y2ground are reactive and resistive components of the response of the ground to interrogation at a second of said two frequencies, wherein the characterizing step (c) provides for determining at least the ratios, for each of the objects, (X1object/X2object), (Y1object/Y2object), and (Y2object/X2object), where X1object, Y1object are reactive and resistive components of the response of one of the objects to interrogation apart from the ground at said first frequency, where X2object, Y2object are reactive and resistive components of the response of said one of the objects to interrogation apart from the ground at said second frequency, and wherein said first number is proportional to: $\tan^{-1}$ [(Y2object/X2object)·[(Y1ground/Y2ground)−(Y1object/Y2object)]/[(X1ground/X2ground)−(X1object/X2object)]].

2. The method of claim 1, wherein the characterizing step (b) provides for determining at least the components X1target, Y1target, X2target, and Y2target, where X1target, Y1target are reactive and resistive components of the response of the target to interrogation in the ground at said first frequency, where X2target, Y2target are reactive and resistive components of the response of the target to interrogation in the ground at said second frequency, wherein said second number is proportional to $\tan^{-1}$ [[[(Y1ground/Y2ground)·(Y2target)]−(Y1target)]/[[(X1ground/X2ground)·(X2target)]−(X1target)]].

3. A method for characterizing a target metal object in ground, comprising:
   (a) characterizing the ground at two distinct sinusoidal frequencies of interrogation;
   (b) characterizing the target metal object in the ground at said two frequencies;
   (c) characterizing a plurality of reference metal objects apart from the ground at said two frequencies;
   (d1) computing a respective first number for each of said reference metal objects using the characterizations of said steps (a) and (c);
   (d2) computing a second number for the target metal object using the characterization of step (b);
   (e) computing said first and second numbers; and
   (f) characterizing the target metal object with the result of the comparison of said step (e), wherein the characterizing step (a) provides for defining two ground balanced axes G1 and G2 corresponding to first and second of said two frequencies respectively, wherein the characterizing step (c) provides for determining, for each of the objects, quantities Aobject and Bobject, where Aobject is the magnitude of the response of one of the objects to interrogation apart from the ground at said first frequency projected onto the axis G1, where Bobject is the magnitude of the response of said one of the objects to interrogation apart from the ground at said second frequency projected onto the axis G2, and wherein said first number is proportional to Aobject/Bobject.

4. The method of claim 3, wherein the characterizing step (b) provides for determining quantities Atarget and Btarget, where Atarget is the magnitude of the response of the target to interrogation in the ground at said first frequency projected onto the axis G1, where Btarget is the magnitude of the response of the target to interrogation in the ground at said second frequency projected onto the axis G2, and wherein said second number is proportional to Atarget/Btarget.

5. A method for characterizing a target metal object in ground, comprising:
   (a) characterizing the ground at two distinct sinusoidal frequencies of interrogation;
   (b) characterizing the target metal object in the ground at said two frequencies;
   (c) characterizing a plurality of reference metal objects apart from the around at said two frequencies;
   (d1) computing a respective first number for each of said reference metal objects using the characterizations of said steps (a) and (c);
   (d2) computing a second number for the target metal object using the characterization of step (b);
   (e) comparing said first and second numbers;
   (f) characterizing the target metal object with the result of the comparison of said step (e);
   (g) characterizing the ground at a third sinusoidal frequency of interrogation distinct from said two frequencies;
   (h) characterizing the target metal object in the ground at said third frequency;
   (i) characterizing the plurality of reference metal objects apart from the ground at said third frequency;
   (j) computing a respective third number for each of said reference metal objects using the characterizations of said steps (g) and (i);
   (k) computing a fourth number for the target metal object using the characterization of step (h);
   (l) comparing said third and fourth numbers;
   (m) characterizing the target metal object with the result of the comparison of said step (1); and
   (n) comparing the identification of step (m) with the identification of step (f) to determine whether the target object is non-ferrous.

6. The method of claim 5, wherein the characterizing step (a) provides for determining at least the ratios (Y1ground/Y2ground) and (X1ground/X2ground), where X1ground, Y1ground are reactive and resistive components of the response of the ground to interrogation at a first of said two frequencies, where X2ground, Y2ground are reactive and resistive components of the response of the ground to interrogation at a second of said two frequencies, wherein the characterizing step (c) provides for determining at least the ratios, for each of the objects, (X1object/X2object), (Y1object/Y2object), and (Y2object/X2object), where X1object, Y1object are reactive and resistive components of the response of one of the objects to interrogation apart from the ground at said first frequency, where X2object, Y2object are reactive and resistive components of the response of said one of the objects to interrogation apart from the ground at said second frequency, and wherein said first number is proportional to: $\tan^{-1}$ [(Y2object/X2object)·[(Y1ground/Y2ground)−(Y1object/Y2object)]/[(X1ground/X2ground)−(X1object/X2object)]].

7. The method of claim 6, wherein the characterizing steps (g) and (a) together provide for determining at least the ratios (Ymground/Ynground) and (Xmground/Xnground), where Xmground, Ymground are reactive and resistive components of the response of the ground to interrogation at one of (z) a selected one of said first and second frequencies and (q) said third frequency, where Xnground, Ynground are reactive and resistive components of the response of the ground to interrogation at the other of (z) and (q), and wherein the characterizing steps (i) and (c) together provide for determining at least the ratios, for each of the objects, (Xmobject/Xnobject), (Ymobject/Ynobject), and (Ynobject/Xnobject), where Xmobject, Ymobject are reactive and resistive components of the response of one of the objects to interrogation apart from the ground at said one of (z) and (q), where Xnobject, Ynobject are reactive and resistive components of the response of said one of the objects to interrogation apart from the ground at said other of (z) and (q), and wherein said third number is proportional to: $\tan^{-1}$ [(Ynobject/Xnobject)·[(Ymground/Ynground)−(Ymobject/Ynobject)]/[(Xmground/Xnground)−(Xmobject/Xnobject)]].

8. The method of claim 7, wherein the characterizing step (b) provides for determining at least the components X1target, Y1target, X2target, and Y2target, where X1target, Y1target are reactive and resistive components of the response of the target to interrogation in the ground at said first frequency, where X2target, Y2target are reactive and resistive components of the response of the target to interrogation in the ground at said second frequency, wherein said second number is proportional to $\tan^{-1}$ [[[(Y1ground/Y2ground)·(Y2target)−(Y1target)]/[[(X1ground/X2ground)·(X2target)]−(X1target)]].

9. The method of claim 8, wherein the characterizing steps (h) and (b) together provide for determining the components Ymtarget, Yntarget, Xmtarget, Xntarget, where Xmtarget, Ymtarget are reactive and resistive components of the response of the target to interrogation in the ground at said one of (z) and (q), where Xntarget, Yntarget are reactive and resistive components of the response of the target to interrogation in the ground at said other of (z) and (q), and wherein said fourth number is proportional to $\tan^{-1}$ [[[(Ymground/Ynground)·(Yntarget)]−(Ymtarget)]/[[(Xmground/Xnground)·(Xntarget)]−(Xmtarget)]].

10. The method of claim 5, wherein the characterizing step (a) provides for defining two ground balanced axes G1 and G2 corresponding to first and second of said two frequencies respectively, wherein the characterizing step (c) provides for determining, for each of the objects, quantities Aobject and Bobject, where Aobject is the magnitude of the response of one of the objects to interrogation apart from the ground at said first frequency projected onto the axis G1, where Bobject is the magnitude of the response of said one of the objects to interrogation apart from the ground at said second frequency projected onto the axis G2, and wherein said first number is proportional to Aobject/Bobject.

11. The method of claim 10, wherein the characterizing steps (g) and (a) together provide for defining two ground balanced axes Gm and Gn, where the axis Gm is one of (z) a selected one of the axes G1 and G2 and (q) a third, ground balanced axis corresponding to said third frequency, where the axis Gn is the other of (z) and (q), wherein the characterizing steps (i) and (c) together provide for determining, for each of the objects, quantities Mobject and Nobject, where Mobject is the magnitude of the response of said one of the objects to interrogation apart from the ground at the frequency corresponding to said one of (z) and (q) projected onto the axis Gm, where Nobject is the magnitude of the response of said one of the objects to interrogation apart from the ground at the frequency corresponding to said other of (z) and (q) projected onto the axis Gn, and wherein said third number is proportional to Mobject/Nobject.

12. The method of claim 11, wherein the characterizing step (b) provides for determining quantities Atarget and Btarget, where Atarget is the magnitude of the response of the target to interrogation in the ground at said first frequency projected onto the axis G1, where Btarget is the magnitude of the response of the target to interrogation in the ground at said second frequency projected onto the axis G2, and wherein said second number is proportional to Atarget/Btarget.

13. The method of claim 12, wherein the characterizing steps (h) and (b) together provide for determining quantities Mtarget and Ntarget, where Mtarget is the magnitude of the response of the target to interrogation in the ground at the frequency corresponding to said one of (z) and (q) projected onto the axis Gm, where Ntarget is the magnitude of the response of the target to interrogation in the ground at the frequency corresponding to said other of (z) and (q) projected onto the axis Gn, and wherein said fourth number is proportional to Mtarget/Ntarget.

14. An apparatus for characterizing a target metal object in ground, comprising:
an interrogating portion for (a) characterizing the ground at two distinct sinusoidal frequencies of interrogation and for (b) characterizing the target metal object in the ground at said two frequencies;
data characterizing a plurality of reference metal objects apart from the ground at said two frequencies; and
a processing portion for computing a respective first number for each of said reference metal objects using the results of said (a) characterizing and said (b) characterizing, computing a second number for the target metal object using said data, first comparing said first and second numbers; and first characterizing the target metal object with the results of said first comparing, wherein said interrogating portion is adapted so that said (a) characterizing provides for determining at least the ratios (Y1ground/Y2ground) and (X1ground/X2ground), where X1ground, Y1ground are reactive and resistive components of the response of the ground to interrogation at a first of said two frequencies, where X2ground, Y2ground are reactive and resistive components of the response of the ground to interrogation at a second of said two frequencies, wherein said data provide for determining at least the ratios, for each of the objects, (X1object/X2object), (Y1object/Y2object), and (Y2object/X2object), where X1object, Y1object are reactive and resistive components of the response of one of the objects to interrogation apart from the ground at said first frequency, where X2object, Y2object are reactive and resistive components of the response of said one of the objects to interrogation apart from the ground at said second frequency, and wherein said processing portion is adapted to compute said first number as being proportional to $\tan^{-1}$ [(Y2object/X2object)·[(Y1ground/Y2ground)−(Y1object/Y2object)]/[(X1ground/X2ground)−(X1object/X2object)]].

15. The apparatus of claim 14, wherein said interrogating portion is further adapted so that said (b) characterizing provides for determining at least the components X1target, Y1target, X2target, and Y2target, where X1target, Y1target are reactive and resistive components of the response of the target to interrogation in the ground at said first frequency, where X2target, Y2target are reactive and resistive components of the response of the target to interrogation in the ground at said second frequency, and wherein said processing portion is adapted to compute said second number as being proportional to $\tan^{-1}$ [[[(Y1ground/Y2ground)·(Y2target)]−(Y1target)]/[[(X1ground/X2ground)·(X2target)]−(X1target)]].

16. An apparatus for characterizing a target metal object in ground, comprising:

an interrogating portion for (a) characterizing the ground at two distinct sinusoidal frequencies of interrogation and for (b) characterizing the target metal object in the ground at said two frequencies;

data characterizing a plurality of reference metal objects apart from the ground at said two frequencies; and a processing portion for computing a respective first number for each of said reference metal objects using the results of said (a) characterizing and said (b) characterizing, computing a second number for the target metal object using said data, first comparing said first and second numbers; and first characterizing the target metal object with the result of said first comparing, wherein said interrogating portion is adapted so that said (a) characterizing provides for defining two ground balanced axes G1 and G2 corresponding to first and second of said two frequencies respectively, wherein said data provide for determining, for each of the objects, quantities Aobject and Bobject, where Aobject is the magnitude of the response of one of the objects to interrogation apart from the ground at said first frequency projected onto the axis G1, where Bobject is the magnitude of the response of said one of the objects to interrogation apart from the ground at said second frequency projected onto the axis G2, and wherein said processing portion is adapted to compute said first number as being proportional to Aobject/Bobject.

17. The apparatus of claim 16, wherein said interrogating portion is further adapted so that said (b) characterizing provides for determining quantities Atarget and Btarget, where Atarget is the magnitude of the response of the target to interrogation in the ground at said first frequency projected onto the axis G1, where Btarget is the magnitude of the response of the target to interrogation in the ground at said second frequency projected onto the axis G2, and wherein said processing portion is adapted to compute said second number as being proportional to Atarget/Btarget.

18. An apparatus for characterizing a target metal object in ground, comprising:

an interrogating portion for (a) characterizing the ground at two distinct sinusoidal frequencies of interrogation and for (b) characterizing the target metal object in the ground at said two frequencies;

data characterizing a plurality of reference metal objects apart from the ground at said two frequencies; and a processing portion for computing a respective first number for each of said reference metal objects using the results of said (a) characterizing and said (b) characterizing, computing a second number for the target metal object using said data, first comparing said first and second numbers; and first characterizing the target metal object with the result of said comparing, wherein said interrogating portion is further adapted for (g) characterizing the ground at a third sinusoidal frequency of interrogation distinct from said two frequencies, and (h) characterizing the target metal object in the ground at said third frequency, wherein said data provide for (i) characterizing the reference metal objects apart from the ground at said third frequency, and wherein said processing portion is further adapted for computing a respective third number for each of the objects using said data, computing a fourth number for the target metal object using the result of said (h) characterizing, second comparing said third and fourth numbers, second characterizing the target metal object with the result of said second comparing, and third comparing the result of said first and second characterizing the target metal object to determine whether the object is non-ferrous.

19. The apparatus of claim 18, wherein said interrogating portion is adapted so that said (a) characterizing provides for determining at least the ratios. (Y1ground/Y2ground) and (X1ground/X2ground), where X1ground, Y1ground are reactive and resistive components of the response of the ground to interrogation at a first of said two frequencies, where X2ground, Y2ground are reactive and resistive components of the response of the ground to interrogation at a second of said two frequencies, wherein said data provide for determining at least the ratios, for each of the objects, (X1object/X2object), (Y1object/Y2object), and (Y2object/X2object), where X1object, Y1object are reactive and resistive components of the response of one of the objects to interrogation apart from the ground at said first frequency, where X2object, Y2object are reactive and resistive components of the response of said one of the objects to interrogation apart from the ground at said second frequency, and wherein said processing portion is adapted to compute said first number as being proportional to $\tan^{-1}$ [(Y2object/X2object)·[(Y1ground/Y2ground)−(Y1object/Y2object)]/[(X1ground/X2ground)−(X1object/X2object)]].

20. The apparatus of claim 19, wherein said interrogating portion is adapted so that said (g) characterizing and said (a) characterizing together provide for determining at least the ratios (Ymground/Ynground) and (Xmground/Xnground), where Xmground, Ymground are reactive and resistive components of the response of the ground to interrogation at one of (z) a selected one of said first and second frequencies and (q) said third frequency, where Xnground, Ynground are reactive and resistive components of the response of the ground to interrogation at the other of (z) and (q), and wherein the characterizing steps (i) and (c) together provide for determining at least the ratios, for each of the objects, (Xmobject/Xnobject), (Ymobject/Ynobject), and (Ynobject/Xnobject), where Xmobject, Ymobject are reactive and resistive components of the response of one of the objects to interrogation apart from the ground at said one of (z) and (q), where Xnobject, Ynobject are reactive and resistive components of the response of said one of the objects to interrogation apart from the ground at said other of (z) and (q), and wherein said third number is proportional to: $\tan^{-1}$ [(Ynobject/Xnobject)·[(Ymground/Ynground)−(Ymobject/Ynobject)]/[(Xmground/Xnground)−(Xmobject/Xnobject)]].

21. The apparatus of claim 20, wherein said interrogating portion is adapted so that said (b) characterizing provides for determining at least the components X1target, Y1target, X2target, and Y2target, where X1target, Y1target are reactive and resistive components of the response of the target to interrogation in the ground at said first frequency, where X2target, Y2target are reactive and resistive components of the response of the target to interrogation in the ground at said second frequency, and wherein said processing portion is adapted to compute said second number as being proportional to $\tan^{-1}$ [[[(Y1ground/Y2ground)·(Y2target)·(Y1target)]/[[(X1ground/X2ground)·(X2target)]−(X1target)]].

22. The apparatus of claim 21, wherein said interrogating portion is further adapted so that said (h) characterizing and said (b) characterizing together provide for determining the components Ymtarget, Yntarget, Xmtarget, Xntarget, where Xmtarget, Ymtarget are reactive and resistive components of the response of the target to interrogation in the ground at said one of (z) and (q), where Xntarget, Yntarget are reactive and resistive components of the response of the target to interrogation in the ground at said other of (z) and (q), and wherein said processing portion is adapted to compute said fourth number as being proportional to $\tan^{-1}$ [[[(Ymground/Ynground)·(Yntarget)]−(Ymtarget)]/[[(Xmground/Xnground)·(Xntarget)]−(Xmtarget)]].

23. The apparatus of claim 18, wherein said interrogating portion is adapted so that said (a) characterizing provides for defining two ground balanced axes G1 and G2 corresponding to first and second of said two frequencies respectively, wherein said data provide for determining, for each of the objects, quantities Aobject and Bobject, where Aobject is the magnitude of the response of one of the objects to interrogation apart from the ground at said first frequency projected onto the axis G1, where Bobject is the magnitude of the response of said one of the objects to interrogation apart from the ground at said second frequency projected onto the axis G2, and wherein said processing portion is adapted to compute said first number as being proportional to Aobject/Bobject.

24. The apparatus of claim 23, wherein said interrogating portion is further adapted so that said (g) characterizing and said (a) characterizing together provide for defining two ground balanced axes Gm and Gn, where the axis Gm is one of (z) the axes G1 and G2 and (q) a third ground balanced axis corresponding to said third frequency, where the axis Gn is the other of (z) and (q), wherein said data provide for determining, for each of the objects, quantities Mobject and Nobject, where Mobject is the magnitude of the response of said one of the objects to interrogation apart from the ground at the frequency corresponding to said one of (z) and (q) projected onto the axis Gm, where Nobject is the magnitude of the response of said one of the objects to interrogation apart from the ground at the frequency corresponding to said other of (z) and (q) projected onto the axis Gn, and wherein said processing portion is adapted to compute said third number as being proportional to Mobject/Nobject.

25. The apparatus of claim 24, wherein said interrogating portion is further adapted so that said (b) characterizing provides for determining quantities Atarget and Btarget, where Atarget is the magnitude of the response of the target to interrogation in the ground at said first frequency projected onto the axis G1, where Btarget is the magnitude of the response of the target to interrogation in the ground at said second frequency projected onto the axis G2, and wherein said processing portion is adapted to compute said second number as being proportional to Atarget/Btarget.

26. The apparatus of claim 25, wherein said interrogating portion is further adapted so that said (h) characterizing and said (b) characterizing together provide for determining quantities Mtarget and Ntarget, where Mtarget is the magnitude of the response of the target to interrogation in the ground at the frequency corresponding to said one of (z) and (q) projected onto the axis Gm, where Ntarget is the magnitude of the response of the target to interrogation in the ground at the frequency corresponding to said other of (z) and (i) projected onto the axis Gn, and wherein said processing portion is adapted to compute said fourth number as being proportional to Mtarget/Ntarget.

* * * * *

UNITED STATES PATENT AND TRADEMARK OFFICE
CERTIFICATE OF CORRECTION

PATENT NO. : 6,911,823 B2 Page 1 of 1
APPLICATION NO. : 10/370306
DATED : June 28, 2005
INVENTOR(S) : Mark D. Rowan It is certified that error appears in the above-identified patent and that said Letters Patent is hereby corrected as shown below:

Claim 26, Column 20, line 41: delete "(i)" and insert --(q)--.

Signed and Sealed this

Twenty-eighth Day of August, 2007

JON W. DUDAS
*Director of the United States Patent and Trademark Office*